US012770930B2

(12) United States Patent
Cao et al.

(10) Patent No.: US 12,770,930 B2
(45) Date of Patent: Oct. 20, 2026

(54) LITHIUM-ION BATTERY CONFIGURED TO REDUCE HOUSING EXTRUSION EFFECT CAUSED BY NEGATIVE ELECTRODE SWELLING

(71) Applicant: ZHUHAI COSMX BATTERY CO., LTD., Zhuhai (CN)

(72) Inventors: Xiaodong Cao, Zhuhai (CN); Fei He, Zhuhai (CN); Suli Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 11 days.

(21) Appl. No.: 19/187,916

(22) Filed: Apr. 23, 2025

(65) Prior Publication Data

US 2026/0005322 A1 Jan. 1, 2026

(30) Foreign Application Priority Data

Jun. 27, 2024 (CN) ........................ 202410850064.4

(51) Int. Cl.

| | |
|---|---|
| ***H01M 10/42*** | (2006.01) |
| ***H01M 10/0525*** | (2010.01) |
| ***H01M 50/434*** | (2021.01) |
| ***H01M 50/451*** | (2021.01) |
| ***H01M 50/489*** | (2021.01) |

(52) U.S. Cl.

CPC ... *H01M 10/4235* (2013.01); *H01M 10/0525* (2013.01); *H01M 50/434* (2021.01); *H01M 50/451* (2021.01); *H01M 50/489* (2021.01)

(58) Field of Classification Search

CPC ............ H01M 50/489; H01M 50/451; H01M 50/434; H01M 10/4235; H01M 10/0525

USPC ............ 429/144, 209, 218.1, 233, 251, 254

See application file for complete search history.

(56) References Cited

U.S. PATENT DOCUMENTS

| | | | | |
|---|---|---|---|---|
| 2019/0097271 | A1* | 3/2019 | Wang | H01M 4/667 |
| 2021/0175513 | A1* | 6/2021 | Horie | B32B 15/20 |
| 2021/0218113 | A1* | 7/2021 | Jin | H01M 50/446 |
| 2023/0216089 | A1* | 7/2023 | Guo | H01M 4/133<br>429/332 |

FOREIGN PATENT DOCUMENTS

| | | | | |
|---|---|---|---|---|
| JP | 2008047305 A | * | 2/2008 | H01M 4/134 |
| JP | 2022120813 A | * | 8/2022 | C25D 3/38 |

* cited by examiner

*Primary Examiner* — Sean P Cullen
(74) *Attorney, Agent, or Firm* — K&L Gates LLP

(57) ABSTRACT

The disclosure provides a lithium-ion battery that satisfies the equation $(2M+3)^2(S+2)^2/W \geq 20$, where $M=\exp(m_1/d_1)+(d_1-2)(m_1-0.26)$. Wherein, $m_1$ is the tensile strength of the negative electrode current collector in the length direction, and $d_1$ is the thickness of the negative electrode current collector. Additionally, $S=\exp(m_2/d_2)+(d_2-2)(m_2-0.16)$, wherein $m_2$ is the puncture strength of the separator, and $d_2$ is the thickness of the substrate within the separator. Furthermore, $W=(((\exp(-10q))/(\varphi-6)+\exp(10q))(d_3-13.5)(\rho-3.5))/100$. This disclosure effectively addresses the issue of pressure exerted on the battery casing due to volume swelling of the negative electrode material, thereby significantly enhancing the battery's cycle life and safety performance.

10 Claims, No Drawings

LITHIUM-ION BATTERY CONFIGURED TO REDUCE HOUSING EXTRUSION EFFECT CAUSED BY NEGATIVE ELECTRODE SWELLING

CROSS-REFERENCES TO RELATED APPLICATIONS

This disclosure claims priority to Chinese Patent Application No. 202410850064.4, entitled with "LITHIUM-ION BATTERY", filed with the China National Intellectual Property Administration on Jun. 27, 2024, the content of which is incorporated herein by reference.

TECHNICAL FIELD

The present disclosure belongs to the technical field of lithium-ion batteries and relates to a lithium-ion battery.

BACKGROUND OF THE INVENTION

Lithium-ion batteries are widely used in new energy vehicles, portable electronic devices, energy storage systems, and other fields due to their advantages such as high voltage, wide operating temperature range, fast charging and discharging, high charging efficiency, large output power, no memory effect, and eco-friendly pollution-free properties. However, during the charging and discharging process of lithium-ion batteries, the insertion of lithium ions into the negative electrode active material causes changes in lattice spacing, resulting in the formation of microscopic internal stress and subsequent swelling of the negative electrode. This macroscopic manifestation is an increase and decrease in the thickness and/or width of the negative electrode coating. This cyclical process can exert pressure on the battery housing, leading to potential damage, safety hazards, and reduced cycle life of the battery.

BRIEF SUMMARY OF THE INVENTION

In order to address the aforementioned drawbacks, the present disclosure provides a lithium-ion battery that can effectively solve the extrusion effect on the battery housing caused by the volume swelling of the negative electrode material, thereby significantly improving the cycle life and safety performance of the battery. The present disclosure provides a lithium-ion battery comprising a negative electrode plate and a separator. The negative electrode plate comprises a negative electrode current collector and a negative electrode active layer disposed on at least one functional surface of the negative electrode current collector. The negative electrode active layer comprises a negative electrode active material.

The lithium-ion battery satisfies Formula 1:

$$(2M+3)^2(S+2)^2/W \geq 20 \quad \text{Formula 1}$$

wherein, $M=\exp(m_1/d_1)+(d_1-2)(m_1-0.26)$, wherein $m_1$ is the tensile strength of the negative electrode current collector in the length direction, measured in GPa; $d_1$ is the thickness of the negative electrode current collector, measured in μm. $S=\exp(m_2/d_2)+(d_2-2)(m_2-0.16)$, wherein $m_2$ is the puncture strength of the separator, measured in kgf; $d_2$ is the thickness of the substrate in the separator, measured in μm.

$W=100((\exp(-10q))/(\varphi-6)+\exp(10q))(d_3-13.5)(\rho-3.5)$, wherein $d_3$ is the thickness of the negative electrode active layer, measured in μm; φ is the OI value of the negative electrode active layer; q is the mass percentage of silicon-based negative electrode material in the negative electrode active material; ρ is the areal density of the negative electrode active layer, measured in mg/cm$^2$.

Furthermore, the lithium-ion battery satisfies Formula 2:

$$(2M+3)^2(S+2)^2/W \geq 50 \quad \text{Formula 2}$$

Furthermore, $m_1$ ranges from 0.3 GPa to 0.8 GPa, and $d_1$ ranges from 3 μm to 9 μm.

Furthermore, M ranges from 1.2 to 4.9.

Furthermore, $m_2$ ranges from 0.18 kgf to 0.6 kgf, and $d_2$ ranges from 3.5 μm to 7 μm.

Furthermore, S ranges from 1.1 to 3.3.

Furthermore, q ranges from 0 to 0.3, $d_3$ ranges from 50 μm to 80 μm, φ ranges from 10 to 30, and ρ ranges from 7 mg/cm$^2$ to 12 mg/cm$^2$.

Furthermore, W ranges from 2 to 80.

Furthermore, the separator further comprises adhesive layers disposed on both sides of the substrate.

The thickness of each adhesive layer is 0.5 to 3 μm.

Furthermore, the separator further comprises a ceramic layer disposed on at least one surface of the adhesive layer away from the substrate.

The thickness of each ceramic layer is 0.5 to 3 μm.

By controlling the tensile strength and thickness of the negative electrode current collector, the puncture strength of the separator and the thickness of the substrate in the separator, and the thickness, OI value, and areal density of the negative electrode active layer, as well as the mass percentage of silicon-based negative electrode material, the lithium-ion battery of the present disclosure satisfies the aforementioned Formula 1. This effectively suppresses the extrusion effect on the battery housing caused by the volume swelling of the negative electrode material. Furthermore, it can prevent the battery from corner leakage and improve the safety and cycle performance of the battery.

DETAILED DESCRIPTION OF THE INVENTION

In order to make the objective, technical solutions, and advantages of the present disclosure clearer, the technical solutions in the embodiments of the present disclosure will be described clearly and completely below in conjunction with the embodiments of the present disclosure. Obviously, the described embodiments are a part of the embodiments of the present disclosure, rather than all of the embodiments. All other embodiments obtained by those of ordinary skill in the art based on the embodiments of the present disclosure without making any inventive efforts shall fall within the scope of protection of the present disclosure.

The present disclosure provides a lithium-ion battery comprising a negative electrode plate and a separator. The negative electrode plate comprises a negative electrode current collector and a negative electrode active layer disposed on at least one functional surface of the negative electrode current collector. The negative electrode active layer comprises a negative electrode active material.

The lithium-ion battery satisfies Formula 1:

$$(2M+3)^2(S+2)^2/W \geq 20. \qquad \text{Formula 1}$$

In Formula 1, $M=\exp(m_1/d_1)+(d_1-2)(m_1-0.26)$, wherein $m_1$ is the tensile strength of the negative electrode current collector in the length direction, measured in GPa; $d_1$ is the thickness of the negative electrode current collector, measured in μm. $S=\exp(m_2/d_2)+(d_2-2)(m_2-0.16)$, wherein $m_2$ is the puncture strength of the separator, measured in kgf; $d_2$ is the thickness of the substrate in the separator, measured in μm.

$W=((\exp(-10q))/(\varphi-6)+\exp(10q))(d_3-13.5)(\rho-3.5)/100$, wherein $d_3$ is the thickness of the negative electrode active layer, measured in μm; φ is the OI value of the negative electrode active layer; q is the mass percentage of silicon-based negative electrode material in the negative electrode active material; ρ is the areal density of the negative electrode active layer, measured in $mg/cm^2$.

Specifically, the negative electrode current collector has two functional surfaces in the thickness direction. In one embodiment, the negative electrode active layer is disposed on one functional surface of the negative electrode current collector, and no functional layer is disposed on the other functional surface. In this case, the thickness $d_3$ of the negative electrode active layer refers to the overall thickness of the negative electrode active layer, and the areal density of the negative electrode active layer refers to the overall areal density of the negative electrode active layer. In another embodiment, the negative electrode active layer is disposed on both functional surfaces of the negative electrode current collector. In this case, the thickness $d_3$ of the negative electrode active layer refers to the thickness of the negative electrode active layer on one side, and the areal density of the negative electrode active layer refers to the areal density of the negative electrode active layer on one side.

The tensile strength $m_1$ of the negative electrode current collector in the length direction in the present disclosure is measured by the following method. The negative electrode current collector is cut into a rectangular sheet sample with a length of 200 mm and a width of 13 mm. The length direction is taken as the tensile direction, and the load area $A_0$ of the rectangular sheet sample perpendicular to the tensile direction is calculated. A tensile tester is used for testing at a tensile rate of 50 mm/min, and the load force $F_0$ at the time of fracture of the rectangular sheet sample is recorded. The tensile strength $m_1$ is $F_0/A_0$, measured in GPa.

The thickness $d_1$ of the negative electrode current collector in the present disclosure is measured using a micrometer, measured in μm.

The puncture strength $m_2$ of the separator in the present disclosure is measured according to GB/T 36363-2018, measured in kgf.

The thickness $d_2$ of the substrate in the separator in the present disclosure is measured by performing SEM testing on the cross-section of the separator to obtain a cross-sectional SEM image, and then the thickness value of the substrate is measured in the cross-sectional SEM image, measured in μm.

The thickness $d_3$ of the negative electrode active layer in the present disclosure is measured through the following steps. Before fabricating the negative electrode plate, the thickness of the negative electrode current collector is measured using a micrometer. Then, the negative electrode active layer is coated on at least one functional surface of the negative electrode current collector, and the negative electrode plate is obtained after being dried and compacted. The thickness of the negative electrode plate is measured using a micrometer. When the negative electrode active layer is disposed on only one functional surface of the negative electrode current collector, the thickness $d_3$ of the negative electrode active layer is obtained by subtracting the thickness of the negative electrode current collector from the thickness of the negative electrode plate. When the negative electrode active layers are disposed on both functional surfaces of the negative electrode current collector, the thickness $d_3$ of the negative electrode active layer is calculated as half of the difference between the thickness of the negative electrode plate and the thickness of the negative electrode current collector, measured in μm.

The OI value φ in the present disclosure is obtained by performing XRD testing on the negative electrode plate. The OI value is the ratio of the peak intensity of the diffraction peak of the (004) crystal plane to the peak intensity of the diffraction peak of the (110) crystal plane in the test results. The 2θ of the diffraction peak of the (004) crystal plane is 53.7°~55.7°, and the 2θ of the diffraction peak of the (110) crystal plane is 76.4°~78.4°.

The areal density of the negative electrode active layer in the present disclosure is measured through the following steps. The weight of the negative electrode current collector per unit area is measured before the negative electrode plate is fabricated. Then, the negative electrode active layer is coated on at least one functional surface of the negative electrode current collector, and the negative electrode plate is obtained after being dried and compacted, then the weight of the negative electrode plate per unit area is measured; when the negative electrode active layer is disposed on only one functional surface of the negative electrode current collector, the areal density ρ of the negative electrode active layer is obtained by subtracting the weight of the negative electrode current collector per unit area from the weight of the negative electrode plate per unit area; when the negative electrode active layers are disposed on both functional surfaces of the negative electrode current collector, the areal density ρ of the negative electrode active layer is calculated as half of the difference between the weight of the negative electrode plate per unit area and the weight of the negative electrode current collector per unit area, measured in $mg/cm^2$.

The type of negative electrode current collector in the present disclosure is not specifically limited. For example, it can be any one selected from a copper current collector, a copper-PET composite current collector, a copper-polypropylene composite current collector, and a copper-polyimide composite current collector, preferably a copper current collector.

The type of substrate in the present disclosure is not specifically limited. For example, it can be any one selected from a polyethylene substrate, a polypropylene substrate, a polyethylene/polypropylene mixed substrate, a polypropylene/ethylene/propylene multilayer co-extruded substrate, a non-woven fabric substrate, a polyimide substrate, and an aramid substrate, preferably a polyethylene substrate.

The source of the negative electrode current collector and the substrate in the present disclosure is not specifically limited. It can be acceptable to use commercially available products or products prepared by conventional preparation methods known to those of ordinary skill in the art.

According to the technical solution provided by the present disclosure, by making the lithium-ion battery satisfy Formula 1, the safety performance and cycle life of the battery can be effectively improved. The inventor analyzed this principle and believed that the reason may be some parameter adjustments shown as below: the tensile strength of the negative electrode current collector in the length direction, the thickness of the negative electrode current collector, the puncture strength of the separator, the thickness of the substrate in the separator, the thickness of the negative electrode active layer, and the OI value, the mass content of the silicon-based negative material in the negative electrode active material, and the areal density of the negative electrode active layer in the lithium-ion battery. By controlling the above parameters, Formula 1 is satisfied, thereby effectively reducing the initial swelling amount of the negative electrode active layer in the thickness direction. At the same time, it is ensured that the separator and the negative electrode current collector can support the swelling of the negative electrode active layer in the width direction, thereby significantly reducing the extrusion force on the housing caused by the swelling of the negative electrode material, especially silicon-based materials. Therefore, the lithium-ion battery of the present disclosure has no corner breakage or leakage problem after 800 cycles at a normal temperature of 25~35° C. and has a good cycle capacity retention rate.

In addition, we found that when the lithium-ion battery satisfies Formula 1, it can effectively reduce the burrs generated by the copper foil, and the separator can effectively resist foreign objects from piercing the separator, thereby effectively alleviating physical self-discharge and improving the self-discharge capability of the lithium-ion battery.

In one specific embodiment, the lithium-ion battery satisfies Formula 2: $(2M+3)^2(S+2)^2/W \geq 50$ Formula 2. Specifically, the M value, S value, and W value are further controlled by further controlling the tensile strength of the negative current collector along the length direction, the thickness of the negative current collector, the puncture strength of the separator, the thickness of the substrate in the separator, the thickness of the negative active layer and the OI value, the mass content of the silicon-based negative material in the negative active material, and the areal density of the negative active layer, so that the lithium-ion battery satisfies Formula 2. When the lithium-ion battery satisfies Formula 2, it can further inhibit the swelling of the negative active layer in the thickness direction and enhance the supporting effect of the separator and the negative current collector on the negative electrode plate, thereby preventing corner leakage and maintaining a good cycle capacity retention rate even after 500 cycles at a high temperature of 35~45° C.

In one specific embodiment, $m_1$ ranges from 0.3 GPa to 0.8 GPa, and $d_1$ ranges from 3 μm to 9 μm. For example, $m_1$ can be 0.3 GPa, 0.4 GPa, 0.5 GPa, 0.6 GPa, 0.7 GPa, or 0.8 GPa; $d_1$ can be 3 μm, 4 μm, 5 μm, 6 μm, 7 μm, 8 μm, or 9 μm. Within these ranges, it can not only ensure that the negative current collector has high tensile strength and provides sufficient support for the negative active layer but also that the thickness of the negative current collector is moderate, reducing the loss of energy density to a certain extent.

In one specific embodiment, M ranges from 1.2 to 4.9. For example, M can be 1.2, 1.6, 2.0, 2.4, 2.8, 3.2, 3.6, 4.0, 4.4, or 4.9. Within this range, the supporting effect of the negative current collector on the negative active layer can be further enhanced to ensure that the negative active layer does not peel off due to volume swelling, affecting the cycle performance of the battery. It further alleviates the extrusion effect of the volume swelling of the negative material on the battery housing, and avoids the problem of corner leakage.

In one specific embodiment, m2 ranges from 0.18 kgf to 0.6 kgf, and $d_2$ ranges from 3.5 μm to 7 μm. For example, $m_2$ can be 0.18 kgf, 0.2 kgf, 0.3 kgf, 0.4 kgf, 0.5 kgf, or 0.6 kgf; $d_2$ can be 3.5 μm, 4 μm, 4.5 μm, 5 μm, 5.5 μm, 6 μm, 6.5 μm, or 7 μm. Within these ranges, it can not only ensure that the separator has high puncture strength and provides sufficient support for the negative active layer but also that the thickness of the substrate in the separator is moderate, reducing the loss of energy density to a certain extent.

In one specific embodiment, S ranges from 1.1 to 3.3. For example, S can be 1.1, 1.3, 1.5, 1.7, 1.9, 2.1, 2.3, 2.5, 2.8, 3.1, or 3.3. Within this range, the supporting effect of the separator on the negative active layer can be further enhanced to ensure that the negative electrode plate does not peel off from the separator or the separator does not rupture due to the volume swelling of the negative active material. This, in turn, prevents any adverse effect on the cycle performance and safety performance of the battery. It can also further alleviate the extrusion effect of the volume swelling of the negative material on the battery housing, avoiding the problem of corner leakage.

In one specific embodiment, q ranges from 0 to 0.3, $d_3$ ranges from 50 μm to 80 μm, φ ranges from 10 to 30, and ρ ranges from 7 mg/cm$^2$ to 12 mg/cm$^2$. For example, q can be 0, 0.05, 0.1, 0.15, 0.2, 0.25, or 0.3; $d_3$ can be 50 μm, 55 μm, 60 μm, 65 μm, 70 μm, 75 μm, or 80 μm; φ can be 10, 15, 20, 25, or 30; ρ can be 7 mg/cm$^2$, 8 mg/cm$^2$, 9 mg/cm$^2$, 10 mg/cm$^2$, 11 mg/cm$^2$, or 12 mg/cm$^2$. At this point, the volume swelling of the negative active layer can be further inhibited, thereby further reducing the initial swelling of the negative active layer in the thickness and width directions. This prevents the negative electrode plate from excessively swelling and squeezing the separator and the housing, which could cause corner leakage. Simultaneously, it can also minimize the loss of energy density and ensure high energy density of the battery.

In one specific embodiment, W ranges from 2 to 80. For example, W can be 2, 10, 20, 30, 40, 50, 60, 70, or 80. Within this range, the volume swelling of the negative active material can be further inhibited, alleviating the extrusion effect of the negative material on the battery housing, resulting in a high cycle life of the battery. It can also ensure high energy density of the battery.

In one specific embodiment, the separator further comprises an adhesive layer disposed on both sides of the substrate; the thickness of the adhesive layer ranges from 0.5 μm to 3 μm.

For example, the thickness of the adhesive layer can be 0.5 μm, 1.0 μm, 1.5 μm, 2.0 μm, 2.5 μm, or 3.0 μm.

The thickness of the adhesive layer in the present disclosure refers to the thickness of a single side of the adhesive layer.

The type of the adhesive layer is not limited in the present disclosure and can be, for example, at least one selected from polyvinylidene fluoride, polymethyl methacrylate, polyimide, polyetherimide, and polyamideimide.

When the thickness of the adhesive layer is within the aforementioned range, it can enhance the interaction between the separator and the negative electrode plate, ensuring that the separator does not peel off from the negative electrode plate due to the swelling of the negative active material. This, in turn, helps to improve the cycle stability of the battery, and reduce the loss of energy density.

In one specific embodiment, the separator further comprises a ceramic layer, which is disposed on at least one surface of the adhesive layer away from the substrate.

The thickness of the ceramic layer ranges from 0.5 μm to 3 μm.

For example, the thickness of the ceramic layer can be 0.5 μm, 1.0 μm, 1.5 μm, 2.0 μm, 2.5 μm, or 3.0 μm.

The type of the ceramic layer is not limited in the present disclosure and can comprise, for example, at least one of alumina, boehmite, magnesium oxide, silicon oxide, aluminum nitride, magnesium hydroxide, and barium sulfate.

When the separator comprises a ceramic layer, it can increase the electrolyte absorption of the separator, reduce the thermal shrinkage of the separator, and improve the cycle performance and safety performance of the battery. When the thickness of the ceramic layer is within the aforementioned range, the loss of energy density can be reduced.

The lithium-ion battery of the present disclosure will be described in detail through specific embodiments as follows.

Example 1

1) Artificial graphite and silicon carbide (with a mass ratio of 85:15), conductive agent carbon black, binder styrene-butadiene rubber, and dispersant carboxymethyl cellulose sodium are dispersed in an appropriate amount of deionized water according to the mass fraction of 97.2:0.5:1:1.3. After being fully stirred to form a uniform negative electrode slurry, the negative electrode slurry is uniformly coated on the surface of a copper foil, with a thickness of 6 μm and a tensile strength in the length direction of 0.55 GPa by a coating machine, then dried, rolled and cut. Subsequently, a negative electrode plate is obtained with a single-sided areal density of 9 $mg/cm^2$, a single-sided compacted density of 1.73 $g/cm^3$, and an OI value of 20, wherein the single-sided thickness of the negative active material layer is 65 μm.
2) The positive active material lithium cobalt oxide, conductive agent carbon black, and binder polyvinylidene fluoride are dispersed in an appropriate amount of N-methylpyrrolidone according to the mass ratio of 97.6:1.2:1.2. After being fully stirred to form a uniform positive electrode slurry, the positive electrode slurry is coated on the surface of an aluminum foil, with a thickness of 10 μm by a coating machine, then dried, rolled and cut. Then, a positive electrode plate is obtained with a single-sided areal density of 16.7 $mg/cm^2$ and a single-sided compacted density of 4.12 $g/cm^3$.
3) The separator comprises a polyethylene layer with a thickness of 5.3 μm and polyvinylidene fluoride layers coated on both sides of the polyethylene layer. An alumina ceramic layer is arranged on the surface of the polyvinylidene fluoride layer on one side. The alumina ceramic layer has a thickness of 2 μm, with 1 μm-thick polyvinylidene fluoride (PV dF) layers on both sides. The puncture strength of the polyethylene layer substrate is 0.39 kgf.
4) The negative electrode plate, separator, positive electrode plate, and separator with fixed sizes are cut and stacked in order, wherein the side of the separator with the ceramic layer is placed facing the positive electrode plate. A jelly roll is prepared by winding, and the housing is an aluminum laminated film. The aluminum laminated film comprises a cavity with a length of 79.2 mm and a width of 60.8 mm. The jelly roll is fixed in the center of the cavity of the aluminum laminated film, and the jelly roll is impregnated with an electrolyte. The electrolyte is a mixed solution comprising ethylene carbonate (EC), propylene carbonate (PC), propyl propionate (PP), lithium hexafluorophosphate (LiPF6), fluoroethylene carbonate (FEC), and 1,3-propanesultone (PS) with a weight ratio of 16:16:48:15:3:2. After the battery is subjected to formation, secondary sealing, and sorting, it has a voltage of 3.75 V, an initial thickness of 3.34 mm, and a capacity of 3001 mA h.

Example 2

The preparation method of the lithium-ion battery in this example is essentially the same as that in Example 1, with the following differences: in step 1), the thickness of the copper foil is adjusted to 4 μm, and the tensile strength is adjusted to 0.43 GPa; additionally, the single-sided thickness of the negative electrode active layer is adjusted to 76 μm, the OI value is adjusted to 14.5, and the single-sided areal density is adjusted to 9.67 $mg/cm^2$.

In Step 3), the thickness of the polyethylene layer is adjusted to 4.2 μm, and the puncture strength of the polyethylene layer substrate is adjusted to 0.22 kgf.

Example 3

The preparation method of the lithium-ion battery in this example is essentially the same as that in Example 1, with the following differences: in Step 1), the mass ratio of artificial graphite to silicon carbide is adjusted to 92:8, the thickness of the copper foil is adjusted to 4 μm, and the tensile strength is adjusted to 0.43 GPa; additionally, the single-sided thickness of the negative electrode active layer is adjusted to 67 μm, the OI value is adjusted to 12.9, and the single-sided areal density is adjusted to 9.25 $mg/cm^2$.

In Step 3), the thickness of the polyethylene layer is adjusted to 4.2 μm, and the puncture strength of the polyethylene layer substrate is adjusted to 0.22 kgf.

Example 4

The preparation method of the lithium-ion battery in this example is essentially the same as that in Example 1, with the following differences: in Step 1), the mass ratio of artificial graphite to silicon carbide is adjusted to 96:4, the thickness of the copper foil is adjusted to 5 μm, and the tensile strength is adjusted to 0.48 GPa; additionally, the single-sided thickness of the negative electrode active layer is adjusted to 67 μm, the OI value is adjusted to 12.9, and the single-sided areal density is adjusted to 9.24 $mg/cm^2$.

In Step 3), the thickness of the polyethylene layer is adjusted to 4.7 μm, and the puncture strength of the polyethylene layer substrate is adjusted to 0.28 kgf.

Example 5

The preparation method of the lithium-ion battery in this example is essentially the same as that in Example 1, with the following difference: in Step 1), the tensile strength of the copper foil is adjusted to 0.3 GPa.

Example 6

The preparation method of the lithium-ion battery in this example is essentially the same as that in Example 1, with the following difference: in Step 1), the tensile strength of the copper foil is adjusted to 0.8 GPa.

Example 7

The preparation method of the lithium-ion battery in this example is essentially the same as that in Example 1, with the following difference: in Step 1), the thickness of the copper foil is adjusted to 3 μm.

Example 8

The preparation method of the lithium-ion battery in this example is essentially the same as that in Example 1, with the following difference: in Step 1), the thickness of the copper foil is adjusted to 9 μm.

Example 9

The preparation method of the lithium-ion battery in this example is essentially the same as that in Example 1, with the following differences: in Step 1), the thickness of the copper foil is adjusted to 4 μm, and the tensile strength is adjusted to 0.33 GPa.

Example 10

The preparation method of the lithium-ion battery in this example is essentially the same as that in Example 1, with the following differences: in Step 1), the thickness of the copper foil is adjusted to 9 μm, and the tensile strength is adjusted to 0.8 GPa.

Example 11

The preparation method of the lithium-ion battery in this example is essentially the same as that in Example 1, with the following difference: in Step 3), the puncture strength of the polyethylene layer is adjusted to 0.18 kgf.

Example 12

The preparation method of the lithium-ion battery in this example is essentially the same as that in Example 1, with the following difference: in Step 3), the puncture strength of the polyethylene layer is adjusted to 0.6 kgf.

Example 13

The preparation method of the lithium-ion battery in this example is essentially the same as that in Example 1, with the following difference: in Step 3), the thickness of the polyethylene layer is adjusted to 3.5 μm.

Example 14

The preparation method of the lithium-ion battery in this example is essentially the same as that in Example 1, with the following difference: in Step 3), the thickness of the polyethylene layer is adjusted to 7 μm.

Example 15

The preparation method of the lithium-ion battery in this example is essentially the same as that in Example 1, with the following differences: in Step 3), the thickness of the polyethylene layer is adjusted to 3.7 μm, and the puncture strength of the polyethylene layer substrate is adjusted to 0.18 kgf.

Example 16

The preparation method of the lithium-ion battery in this example is essentially the same as that in Example 1, with the following differences: In Step 3), the thickness of the polyethylene layer is adjusted to 7 μm, and the puncture strength of the polyethylene layer substrate is adjusted to 0.6 kgf.

Example 17

The preparation method of the lithium-ion battery in this example is essentially the same as that in Example 1, with the following differences: in Step 1), the negative active material is replaced with pure synthetic graphite, and silicon carbide is not used.

Example 18

The preparation method of the lithium-ion battery in this example is essentially the same as that in Example 1, with the following differences: in Step 1), the single-sided thickness of the negative active layer is set to 50 μm, and the OI value of the negative electrode plate is adjusted to 13.

Example 19

The preparation method of the lithium-ion battery in this example is essentially the same as that in Example 1, with the following differences: in Step 1), the single-sided thickness of the negative active layer is set to 80 μm, and the OI value of the negative electrode plate is adjusted to 26.

Example 20

The preparation method of the lithium-ion battery in this example is essentially the same as that in Example 1, with the following difference: in Step 1), the single-sided areal density of the negative electrode plate is adjusted to 7 $mg/cm^2$.

Example 21

The preparation method of the lithium-ion battery in this example is essentially the same as that in Example 1, with the following difference: in Step 1), the single-sided areal density of the negative electrode plate is adjusted to 12 $mg/cm^2$.

Example 22

The preparation method of the lithium-ion battery in this example is essentially the same as that in Example 1, with the following differences: in Step 1), the negative active material is replaced with pure synthetic graphite, and silicon carbide is not used; the single-sided thickness of the negative active layer is set to 53 μm; the OI value of the negative electrode plate is adjusted to 23; and the single-sided areal density of the negative electrode plate is adjusted to 8.3 $mg/cm^2$.

Example 23

The preparation method of the lithium-ion battery in this example is essentially the same as that in Example 1, with the following differences. In Step 1): the single-sided thickness of the negative active layer is 75 μm, with an OI value of 18. The negative active material comprises synthetic graphite and silicon carbide (mass ratio 70:30). The thickness of the copper foil is adjusted to 7 μm, and its tensile strength is adjusted to 0.6 GPa. The OI value of the negative electrode plate is adjusted to 18, and its single-sided areal density is adjusted to 9.97 mg/cm$^2$.

In Step 3): the thickness of the polyethylene layer is adjusted to 7 μm, and the puncture strength of the polyethylene layer substrate is adjusted to 0.6 kgf.

Example 24

The preparation method of the lithium-ion battery in this example is essentially the same as that in Example 1, with the following differences. In Step 1): the single-sided thickness of the negative active layer is 83 μm, with an OI value of 35. The negative active material comprised synthetic graphite and silicon carbide (mass ratio 64:36). The thickness of the copper foil is adjusted to 10.00 μm, and its tensile strength is adjusted to 0.85 GPa. The OI value of the negative electrode plate is adjusted to 35.0, and its single-sided areal density is adjusted to 12.42 mg/cm$^2$.

In Step 3): the thickness of the polyethylene layer is adjusted to 9.0 μm, and the puncture strength of the polyethylene layer substrate is adjusted to 0.73 kgf.

Comparative Example 1

The preparation method of the lithium-ion battery in this example is essentially the same as that in Example 1, with the following differences: in Step 1), the mass ratio of synthetic graphite to silicon carbide is adjusted to 70:30; the single-sided thickness of the negative active layer is set to 75 μm; the OI value of the negative electrode plate is adjusted to 18; and the single-sided areal density of the negative electrode plate is adjusted to 9.97 mg/cm$^2$.

Comparative Example 2

The preparation method of the lithium-ion battery in this example is essentially the same as that in Example 1, with the following differences: in Step 1), the mass ratio of synthetic graphite to silicon carbide is adjusted to 89:11; the thickness of the copper foil is adjusted to 2.8 μm, and its tensile strength is adjusted to 0.21 GPa; the single-sided thickness of the negative active layer is adjusted to 84 μm; the OI value is adjusted to 35; and the single-sided areal density is adjusted to 13 mg/cm$^2$;

in Step 3), the thickness of the polyethylene layer is adjusted to 3 μm, and the puncture strength of the polyethylene layer substrate is adjusted to 0.15 kgf.

Experimental Test

The following properties are tested for the negative current collectors in the above examples and comparative examples: tensile strength along the length direction of the negative current collector, thickness of the negative current collector, puncture strength of the separator, thickness of the separator substrate, thickness of the negative active layer, and OI value of the negative active layer.

(1) Tensile Strength of the Negative Current Collector Along the Length Direction Rectangular samples measuring 200 mm in length and 13 mm in width are cut from the negative current collector. With the length direction as the tensile direction, the load area ($A_0$) of the rectangular sample perpendicular to the tensile direction is calculated. Tests are conducted using a tensile tester at a tensile rate of 50 mm/min. The load force ($F_0$) at the moment of sample fracture is recorded, and the tensile strength ($m_1$) is calculated as $F_0/A_0$ in units of GPa.

(2) Thickness of the Negative Current Collector

The thickness of the negative current collector is measured using a micrometer in units of μm.

(3) Puncture Strength of the Separator

The puncture strength of the separator is tested in accordance with the GB/T 36363-2018.

(4) Thickness of the Separator Substrate

The thickness of the separator substrate is determined by SEM observation of its cross-section in units of μm.

(5) Thickness of the Negative Active Layer

The thickness of the negative current collector is measured using a micrometer. Subsequently, the thickness of the negative electrode plate containing the negative current collector is measured using a micrometer. The thickness of the negative active layer is calculated as half of the difference between thickness of the negative electrode plate and thickness of the negative current collector, measured in μm.

(6) OI Value of the Negative Active Layer

X-ray diffraction (XRD) analysis is performed on the negative electrode plate. The OI value is defined as the ratio of the diffraction peak intensity of the (004) crystal plane to that of the (110) crystal plane. The 2θ value for the (004) crystal plane is in the range of 53.7°-55.7°, and the 2θ value for the (110) crystal plane is in the range of 76.4°-78.4°.

Test results and calculations are shown in Tables 1 and 2.

TABLE 1

| | $m_1$ GPa | $d_1$ μm | $m_2$ kgf | $d_2$ μm | $d_3$ μm | φ | q | ρ mg/cm$^2$ |
|---|---|---|---|---|---|---|---|---|
| example 1 | 0.55 | 6.00 | 0.39 | 5.3 | 65 | 20 | 0.15 | 9.00 |
| example 2 | 0.43 | 4.00 | 0.22 | 4.2 | 76 | 14.5 | 0.15 | 9.67 |
| example 3 | 0.43 | 4.00 | 0.22 | 4.2 | 67 | 12.9 | 0.08 | 9.25 |
| example 4 | 0.48 | 5.00 | 0.28 | 4.7 | 67 | 12.9 | 0.04 | 9.24 |
| example 5 | 0.3 | 6.00 | 0.39 | 5.3 | 65 | 20 | 0.15 | 9.00 |
| example 6 | 0.8 | 6.00 | 0.39 | 5.3 | 65 | 20 | 0.15 | 9.00 |
| example 7 | 0.55 | 3.00 | 0.39 | 5.3 | 65 | 20 | 0.15 | 9.00 |
| example 8 | 0.55 | 9.00 | 0.39 | 5.3 | 65 | 20 | 0.15 | 9.00 |
| example 9 | 0.33 | 4.00 | 0.39 | 5.3 | 65 | 20 | 0.15 | 9.00 |
| example 10 | 0.8 | 9.00 | 0.39 | 5.3 | 65 | 20 | 0.15 | 9.00 |
| example 11 | 0.55 | 6.00 | 0.18 | 5.3 | 65 | 20 | 0.15 | 9.00 |
| example 12 | 0.55 | 6.00 | 0.60 | 5.3 | 65 | 20 | 0.15 | 9.00 |
| example 13 | 0.55 | 6.00 | 0.39 | 3.5 | 65 | 20 | 0.15 | 9.00 |
| example 14 | 0.55 | 6.00 | 0.39 | 7.0 | 65 | 20 | 0.15 | 9.00 |
| example 15 | 0.55 | 6.00 | 0.18 | 3.7 | 65 | 20 | 0.15 | 9.00 |
| example 16 | 0.55 | 6.00 | 0.60 | 7.0 | 65 | 20 | 0.15 | 9.00 |
| example 17 | 0.55 | 6.00 | 0.39 | 5.3 | 65 | 20 | 0 | 9.00 |
| example 18 | 0.55 | 6.00 | 0.39 | 5.3 | 50 | 13 | 0.15 | 9.00 |
| example 19 | 0.55 | 6.00 | 0.39 | 5.3 | 80 | 26 | 0.15 | 9.00 |
| example 20 | 0.55 | 6.00 | 0.39 | 5.3 | 65 | 20 | 0.15 | 7.00 |
| example 21 | 0.55 | 6.00 | 0.39 | 5.3 | 65 | 20 | 0.15 | 12.00 |

TABLE 1-continued

| | $m_1$ GPa | $d_1$ μm | $m_2$ kgf | $d_2$ μm | $d_3$ μm | φ | q | ρ $mg/cm^2$ |
|---|---|---|---|---|---|---|---|---|
| example 22 | 0.55 | 6.00 | 0.39 | 5.3 | 53 | 23 | 0 | 8.3 |
| example 23 | 0.6 | 7.00 | 0.60 | 7.0 | 75 | 18 | 0.3 | 9.97 |
| example 24 | 0.85 | 10.00 | 0.73 | 9.0 | 83 | 35.0 | 0.36 | 12.42 |
| Comparative Example 1 | 0.55 | 6.00 | 0.39 | 5.3 | 75 | 18 | 0.3 | 9.97 |
| Comparative Example 2 | 0.21 | 2.80 | 0.15 | 3 | 84 | 35 | 0.11 | 13.00 |

TABLE 2

| | M | S | W | $(2M + 3)^2(S + 2)^2/W$ |
|---|---|---|---|---|
| example 1 | 2.3 | 1.8 | 12.74 | 65 |
| example 2 | 1.5 | 1.2 | 17.38 | 20 |
| example 3 | 1.5 | 1.2 | 7.05 | 50 |
| example 4 | 1.8 | 1.4 | 4.88 | 100 |
| example 5 | 1.2 | 1.8 | 12.74 | 34 |
| example 6 | 3.3 | 1.8 | 12.74 | 107 |
| example 7 | 1.5 | 1.8 | 12.74 | 41 |
| example 8 | 3.1 | 1.8 | 12.74 | 97 |
| example 9 | 1.2 | 1.8 | 12.74 | 34 |
| example 10 | 4.9 | 1.8 | 12.74 | 188 |
| example 11 | 2.3 | 1.1 | 12.74 | 43 |
| example 12 | 2.3 | 2.6 | 12.74 | 93 |
| example 13 | 2.3 | 1.5 | 12.74 | 53 |
| example 14 | 2.3 | 2.2 | 12.74 | 78 |
| example 15 | 2.3 | 1.1 | 12.74 | 42 |
| example 16 | 2.3 | 3.3 | 12.74 | 124 |
| example 17 | 2.3 | 1.8 | 3.03 | 274 |
| example 18 | 2.3 | 1.8 | 9.06 | 92 |
| example 19 | 2.3 | 1.8 | 16.43 | 51 |
| example 20 | 2.3 | 1.8 | 8.11 | 102 |
| example 21 | 2.3 | 1.8 | 19.69 | 42 |
| example 22 | 2.3 | 1.8 | 2.01 | 413 |
| example 23 | 2.8 | 3.3 | 79.94 | 26 |
| example 24 | 5.8 | 5.1 | 226.89 | 47 |
| Comparative Example 1 | 2.3 | 1.8 | 79.94 | 10 |
| Comparative Example 2 | 1.0 | 1.0 | 20.20 | 12 |

From Tables 1 and 2, it can be observed as follows.

All lithium-ion batteries in Examples 1-24 satisfy Equation 1, among which Examples 1, 3, 4, 6, 8, 10, 12-14, 16-20, and 22 also satisfy Equation 2; whereas Comparative Examples 1 and 2 do not satisfy Equation 1.

The lithium-ion batteries from the aforementioned examples and comparative examples are tested for corner breakage and electrolyte leakage, cycle performance, energy density, rate capability, and self-discharge capacity.

(1) Cycle Performance and Corner Breakage

Room temperature cycle performance: the lithium-ion batteries prepared in the examples and comparative examples are placed in a 25±2° C. environment, charged at a constant current of 1C until the cutoff current reaches 0.05C, rested for 5 minutes after being fully charged, and then discharged at a constant current of 0.5C to a cutoff voltage of 3.0V. This charge-discharge cycle is repeated three times, and the highest discharge capacity during the first three cycles is recorded as the initial capacity $Q_0$. After 800 cycles, the discharge capacity $Q_1$ is recorded, and the high temperature capacity retention rate is calculated as $Q_1/Q_0 \times 100\%$. During this process, the battery appearance is checked every 50 cycles to observe and record any corner breakage.

High temperature cycle performance: the lithium-ion batteries prepared in the examples and comparative examples are placed in a 45±2° C. environment and allowed to rest until the battery body reached 45±2° C. The batteries are then charged at a constant current of 1.2C until reaching a voltage of 4.25V, followed by charging at 0.7C until reaching the upper voltage limit of 4.53V, and then charged at a constant voltage until reaching a constant current of 0.025C. After resting for 10 minutes, the batteries are discharged at 0.5C until reaching a voltage of 3V and rested for another 10 minutes. This charge-discharge cycle is repeated 500 times, and the discharge capacity Q 3 is recorded. The high temperature capacity retention rate is calculated as $Q_2/Q_3 \times 100\%$. During this process, the battery appearance is checked every 50 cycles to observe and record any corner breakage.

(2) Self-Discharge Capacity

In this disclosure, the K-value is used to evaluate the self-discharge capacity of the batteries. Specifically, after the completion of the battery cell grading process for the batteries prepared in the examples and comparative examples, the battery cells are placed in a high temperature room at 45° C. and allowed to rest for 48 hours. After resting, the battery cells are further rested in a 25° C. environment for 36 hours. The battery cell voltage is then recorded as $V_1$ (mV). After resting for another T hours (approximately 72 hours), the battery cell voltage is recorded as $V_2$ (mV). The K-value is calculated as $(V_1-V_2)/T$, measured in mV/h.

The test results are shown in Table 3.

TABLE 3

| | Capacity retention rate after 800 cycles at room temperature (%) | Corner ruptures and leakage occur after 800 cycles at room temperature | Cycle number when corner rupture and leakage occur during cycling at room temperature | Capacity retention rate after 500 cycles at high temperature (%) | Corner ruptures and leakage occur after 500 cycles at high temperature | Cycle number when corner ruptures and leakage occur during cycling at high temperature | K value mV/h |
|---|---|---|---|---|---|---|---|
| Example 1 | 81.48 | N | / | 73.12 | N | / | 0.0220 |
| Example 2 | 76.15 | N | / | 65.49 | Y | 350T | 0.0281 |
| Example 3 | 82.32 | N | / | 74.32 | N | / | 0.0248 |
| Example 4 | 82.92 | N | / | 74.29 | N | / | 0.0213 |
| Example 5 | 77.75 | N | / | 66.48 | Y | 400T | 0.2790 |
| Example 6 | 81.18 | N | / | 74.48 | N | / | 0.0194 |
| Example 7 | 77.96 | N | / | 67.33 | Y | 400T | 0.0275 |
| Example 8 | 80.83 | N | / | 73.95 | N | / | 0.0183 |
| Example 9 | 77.36 | N | / | 65.39 | Y | 400T | 0.0288 |

TABLE 3-continued

| | Capacity retention rate after 800 cycles at room temperature (%) | Corner ruptures and leakage occur after 800 cycles at room temperature | Cycle number when corner rupture and leakage occur during cycling at room temperature | Capacity retention rate after 500 cycles at high temperature (%) | Corner ruptures and leakage occur after 500 cycles at high temperature | Cycle number when corner ruptures and leakage occur during cycling at high temperature | K value mV/h |
|---|---|---|---|---|---|---|---|
| Example 10 | 82.49 | N | / | 74.73 | N | / | 0.0184 |
| Example 11 | 76.55 | N | / | 67.37 | Y | 450T | 0.0277 |
| Example 12 | 80.38 | N | / | 73.65 | N | / | 0.0192 |
| Example 13 | 80.03 | N | / | 73.16 | N | / | 0.0202 |
| Example 14 | 81.16 | N | / | 73.46 | N | / | 0.0195 |
| Example 15 | 78.12 | N | / | 67.95 | Y | 450T | 0.0256 |
| Example 16 | 82.12 | N | / | 74.65 | N | / | 0.0173 |
| Example 17 | 84.18 | N | / | 75.59 | N | / | 0.0159 |
| Example 18 | 81.04 | N | / | 74.28 | N | / | 0.0177 |
| Example 19 | 79.36 | N | / | 73.19 | N | / | 0.0203 |
| Example 20 | 81.55 | N | / | 74.59 | N | / | 0.0187 |
| Example 21 | 78.02 | N | / | 67.32 | Y | 450T | 0.0255 |
| Example 22 | 84.33 | N | / | 75.42 | N | / | 0.0136 |
| Example 23 | 75.38 | N | / | 56.63 | Y | 350T | 0.0315 |
| Example 24 | 76.12 | N | / | 54.37 | Y | 350T | 0.0146 |
| Comparative Example 1 | 38.47 | Y | 150T | 48.37 | Y | 100T | 0.0416 |
| Comparative Example 2 | 45.12 | Y | 200T | 48.52 | Y | 150T | 0.0352 |

From Tables 1-3, it can be observed as follows.

The lithium-ion batteries in Examples 1-24 exhibit better cycle performance compared to Comparative Examples 1 and 2, with a lower probability of corner breakage and electrolyte leakage. Among them, the lithium-ion battery in Example 22 demonstrates a capacity retention rate of 84.33% after 800 cycles at room temperature and 75.42% after 500 cycles at high temperature. Notably, this battery does not experience any corner breakage or electrolyte leakage, and it has a K-value of 0.0136. In contrast, in the comparative examples, the capacity retention rate is only 45.12% after 800 cycles at room temperature and 48.52% after 500 cycles at high temperature. Notably, corner breakage and electrolyte leakage are observed after just 200 cycles at room temperature and 150 cycles at high temperature. Therefore, the lithium-ion battery of the present disclosure can effectively address the extrusion effect on the battery housing caused by the volume swelling of the negative electrode material, thereby significantly improving the cycle life and safety performance of the battery.

Finally, it should be noted that: the foregoing examples are provided solely for illustrating the technical solutions of the present disclosure, and are not intended to be limiting. Although the present disclosure has been described in detail with reference to the foregoing examples, it should be understood by those of ordinary skill in the art that modifications to the technical solutions described in the foregoing examples, or equivalent substitutions of some or all of the technical features therein, may still be made, and such modifications or substitutions do not cause the essence of the corresponding technical solutions to deviate from the scope of the technical solutions of the examples of the present disclosure.

What is claimed is:

1. A lithium-ion battery, comprising;

a negative electrode plate; and a separator comprising a substrate, wherein the negative electrode plate comprises a negative current collector and a negative active layer disposed on at least one functional surface of the negative current collector, and the negative active layer comprises a negative active material, wherein the negative active material comprises a silicon-based negative electrode material;

wherein the lithium-ion battery satisfies the following formula 1:

$$50 \le (2M+3)^2(S+2)^2/W \le 102; \quad \text{Formula 1}$$

in Formula 1, $M=\exp(m_1/d_1)+(d_1-2)(m_1-0.26)$, wherein $m_1$ is a tensile strength of the negative current collector in a length direction, measured in GPa;

$d_1$ is a thickness of the negative current collector, measured in μm;

$S=\exp(m_2/d_2)+(d_2-2)\ (m_2-0.16)$, wherein $m_2$ is a puncture strength of the separator, measured in kgf; and $d_2$ is a thickness of the substrate in the separator, measured in μm;

$W=((\exp\ (-10q))/(\varphi-6)+\exp(10q))(d_3-13.5)(\rho-3.5)/100$, wherein $d_3$ is a thickness of the negative active layer, measured in μm;

$\varphi$ is an OI value of the negative active layer;

q is a mass percentage of the silicon-based negative electrode material in the negative active material; and $\rho$ is a areal density of the negative active layer, measured in $mg/cm^2$, wherein $m_1$ ranges from 0.3 GPa to 0.8 GPa, and $d_1$ ranges from 5 μm to 9 μm, and d2 ranges from 5.3 μm to 7 μm, wherein M ranges from 1.2 to 3.3.

2. The lithium-ion battery according to claim 1, wherein the negative current collector comprises a copper current collector.

3. The lithium-ion battery according to claim 1, wherein the negative current collector comprises a copper-PET composite current collector.

4. The lithium-ion battery according to claim 1, wherein the negative current collector comprises a copper-polypropylene composite current collector.

5. The lithium-ion battery according to claim 1, wherein the negative current collector comprises a copper-polyimide composite current collector.

6. The lithium-ion battery according to claim 1, wherein the separator further comprises an adhesive layer disposed on both sides of the substrate;

the thickness of the adhesive layer ranges from 0.5 to 3 μm.

7. The lithium-ion battery according to claim 1, wherein $m_2$ ranges from 0.18 kgf to 0.6 kgf.

8. The lithium-ion battery according to claim 7, wherein S ranges from 1.1 to 3.3.

9. The lithium-ion battery according to claim 1, wherein q ranges from 0.05% to 0.3%, $d_3$ ranges from 50 μm to 80 μm, φ ranges from 10 to 30, and ρ ranges from 7 mg/cm$^2$ to 12 mg/cm$^2$.

10. The lithium-ion battery according to claim 9, wherein W ranges from 2 to 80.

* * * * *